P. CONNOLLY.
Hydrant.

No. 202,793. Patented April 23, 1878.

Witnesses:
A. H. Gontner
H. A. Johnstone

Inventor:
Patrick Connolly
by his attorney
J. D. Stetson

UNITED STATES PATENT OFFICE.

PATRICK CONNOLLY, OF BROOKLYN, NEW YORK.

IMPROVEMENT IN HYDRANTS.

Specification forming part of Letters Patent No. 202,793, dated April 23, 1878; application filed March 25, 1878.

*To all whom it may concern:*

Be it known that I, PATRICK CONNOLLY, of Brooklyn, Kings county, in the State of New York, have invented certain new and useful Improvements Relating to Hydrants, of which the following is a specification:

I have devised a combination of a hydrant or analogous device with a cock and connections for controlling the supply of water to a house, so that a single valve may control the supply to both, while the hydrant is also further controlled by its proper valve.

The accompanying drawings form a part of this specification, and represent what I consider the best means of carrying out the invention.

Figure 1:
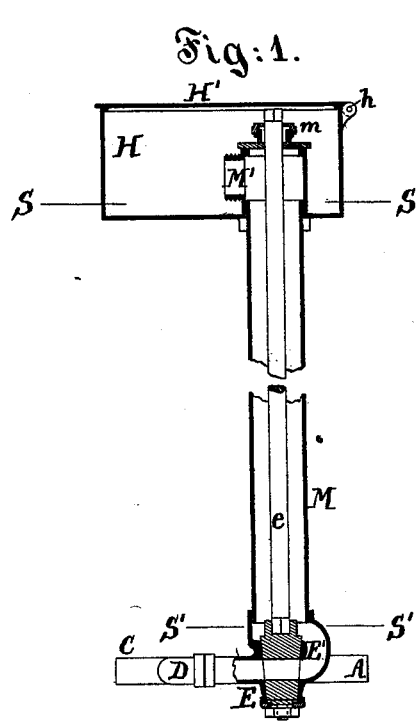
Figure 3:
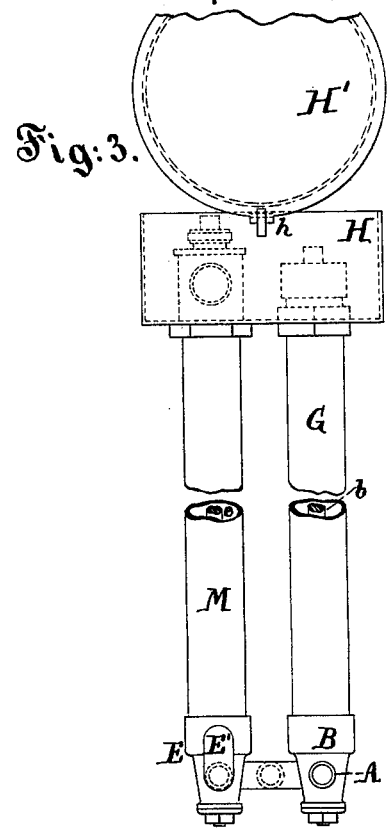
Figure 2:
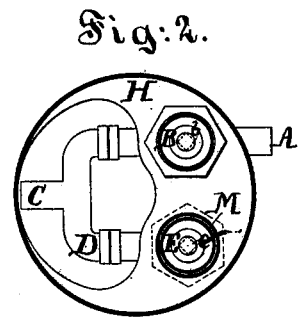
Figure 4:
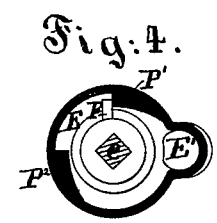

Figure 1 is a vertical section through the upper and lower parts. The middle portion, which is broken away, may be of any length, according to the depths of the water-pipe below the surface which the apparatus is intended to control. Fig. 2 is a horizontal section on the line S S in Fig. 1. Fig. 3 is an elevation at right angles to Fig. 1, the cover of the top case being represented as raised, while in Fig. 1 the cover is shut down. Fig. 4 is a horizontal section on the line S' S' in Fig. 1 on a larger scale.

Similar letters of reference indicate like parts in all the figures.

A is the water-pipe, leading from a street-main. (Not represented.) B is a controlling-cock and connected casing, adapted to control the flow of water by the application of a key (not represented) on the squared upper end of the rod or shaft $b$.

I have made the parts B $b$ and their relations to the water-pipe C leading to the house the subject of another and separate application for patent.

D is a branch from the pipe C on the house side of the controlling-cock B. The shutting off of the cock B excludes the water not only from the house, (not represented,) which is supplied by the pipe C, but also from the branch D. E is a stop-cock, having a channel, E', cored or otherwise produced in its substance, leading upward and inward, so that the water which passes the plug may flow through the channel E' and through the pipe M, which surrounds the rod or shaft $e$, and thus in a stream with full pressure to the top of the apparatus. On one side, near the top, is a neck, M', adapted to receive, by a coupling of any ordinary or suitable construction, a hose-pipe for a street-washer, or a pipe of analogous or suitable character, to conduct the water to any point desired.

The branch M' may be extended upward in metal, and formed with a neck or nozzle for delivering the water into a pail, like the ordinary small hydrants, for domestic use.

The operating-rod $e$ extends out through the top of the pipe M, controlled by a stuffing-box, $m$, which may be provided with a screw-gland or other convenient device for tightening it and for repacking, when required.

I have marked as G the pipe which incloses the rod $b$.

I inclose the upper end of the pipe M, which is preferably alongside, and also of its accompanying pipe G, in a casing, H, of cast-iron or other suitable material, formed with a liberal opening in its bottom, through which any waste-water may readily escape by slow absorption into the ground. I provide it with a cover, H', hinged at the point $h$. It may be any simple or elaborate fastening, as a lock controlled by a key, if desired.

I provide both the pipes G and M with ordinary draining-passages, which allow the water left in them at the close of an operation to slowly escape into the surrounding soil.

I adopt the well-known plan of so placing the waste-holes that they will only discharge water when the plug is shut—that is to say, they will discharge the water which remains on the delivery side of either cock, respectively, when the said cock is closed; but when the cock is open the discharge-hole will be covered and effectually stopped by a solid part of the plug.

In order to satisfactorily accomplish this, an ordinary simple mark with a file, or the like, across the upper end of the plug, to show the direction of the aperture in the cock, is not alone sufficient. The delivery must be always in the same direction. It is important to prevent the plug from ever becoming turned around. I have in my other said application for patent shown how to attain this end by stops at the upper end of the apparatus. I can, if preferred, place the stops down close to the plug.

A pin, F, fixed in the side of the plug of the cock, strikes at each quarter-turn alternately against the stops P¹ P², and prevents the plug from ever being turned more than about a quarter of a revolution. It allows it to be turned sufficient only to turn it full off and full on with the water flowing through the plug in the right direction.

The rod e may be forged or otherwise made in one piece with the plug E, and some portion of the benefits of my invention may be realized; but I have made them in separate pieces, forming the plug with a square socket, and the lower end of the rod e with a square tenon, which matches tightly therein. This allows the rod to be of iron or steel, while the plug of the cock may be of brass, with great economy in cost as well as increased convenience in the applying of the parts together, and removing, repairing, or exchanging parts, when required.

Modifications may be made. Some parts of the invention may be useful without the others. I can use the valve E with the side passage E', controlling-rod e, and pipe M, at a considerable distance from the valve B, with its rod b and case G, by sacrificing the advantages due to the case H. I propose, in some cases, to mount the valve E and its connections in the back yard of a dwelling, while the valve B and its connections are at the front. A water-closet or other adjunct of a building requiring the water under conditions where it is liable to freeze may be supplied with the same through the cock E and its connections, the cock being deeply buried in the earth and supplying the water at the top, controlled by both the valves E and B.

I propose, in some cases, when the part E and its connections are used as a hydrant, to provide a coiled spring within the pipe M, which shall take hold of the rod e and exert a sufficient force to turn the cock E automatically, thus rendering the device self-closing.

The pipes M and G may be threaded inside of the cocks below and of the casing above, as shown; or the pipes may be made a little larger, and threaded on the interior at the ends, and made to match on the exterior of correspondingly-threaded parts at each end. The latter may be preferable in some situations.

The upper end of the pipe M, when it does not terminate in a casing, H, may be extended upward, so that the branch M' may deliver directly at a proper height for a pail or tub without requiring any upward extension therefrom.

I believe I can operate successfully by giving a vertical movement to the rod e instead of a turning movement, and operating by suitable lever or other device at the top, with a valve at the bottom adapted to be opened by lifting, and to be closed either by the attendant or by automatic movement when it is liberated.

When the casing H, with its cover H', is employed, and controlled by a lock, the key may, if desired, be retained by the water authorities, so that the owner of the house or the user of the water has no access thereto.

I claim as my invention—

1. The valve E, with its side passage E', delivering the water through the same case M which incloses the rod e, substantially as and for the purposes herein specified.

2. In combination with the single connection A from the street, the valve B, controlling the house-pipe C, and the valve E, connected by the branch D, and delivering the water through the pipe M, subject to the control of both valves E and B, as herein specified.

3. The casing H, cover H', pipes G and M M', with their valves B E and operating-rods b e, in combination with each other and with the single street-connection A and pipes C D, as and for the purposes herein specified.

4. The rod e, formed in a separate piece from the plug of the cock E, and united by a socket, as shown, adapted to serve with the receiving-branch D, side passage E', pipe M, stuffing-box m, and delivering-passage M', as and for the purposes herein specified.

In testimony whereof I have hereunto set my name in presence of two subscribing witnesses.

PATRICK CONNOLLY.

Witnesses:
W. L. BENNEM,
CHAS. C. STETSON.